(12) United States Patent
Aronson et al.

(10) Patent No.: US 10,919,788 B2
(45) Date of Patent: Feb. 16, 2021

(54) INTEGRATED SYSTEM FOR GENERATING, STORING AND DISPENSING CLEAN ENERGY AND DESALINATING WATER

(71) Applicant: Oceanus Power & Water, LLC, Palo Alto, CA (US)

(72) Inventors: Neal Aronson, Palo Alto, CA (US); Sandra Walker, Wilton, CA (US); Jose Alberto Garcia Guerrero, Mexicali (MX); Joan Leal Jeldrez, Palo Alto, CA (US); Mark Allen, Menlo Park, CA (US)

(73) Assignee: Oceanus Power & Water, LLC, Palo Alto, CA (US)

( * ) Notice: Subject to any disclaimer, the term of this patent is extended or adjusted under 35 U.S.C. 154(b) by 75 days.

(21) Appl. No.: 15/858,884

(22) Filed: Dec. 29, 2017

(65) Prior Publication Data

US 2018/0290902 A1    Oct. 11, 2018

Related U.S. Application Data

(60) Provisional application No. 62/483,879, filed on Apr. 10, 2017, provisional application No. 62/513,845, filed on Jun. 1, 2017.

(51) Int. Cl.
| | | |
|---|---|---|
| *C02F 1/44* | (2006.01) | |
| *C02F 1/00* | (2006.01) | |
| *B01D 61/02* | (2006.01) | |
| *B01D 61/06* | (2006.01) | |
| *B01D 61/08* | (2006.01) | |

(Continued)

(52) U.S. Cl.
CPC ............ *C02F 1/441* (2013.01); *B01D 61/025* (2013.01); *B01D 61/06* (2013.01); *B01D 61/08* (2013.01);

(Continued)

(58) Field of Classification Search
None
See application file for complete search history.

(56) References Cited

U.S. PATENT DOCUMENTS 4,634,533 A * 1/1987 Somerville ............. C02F 1/722
                                                    210/722
4,645,599 A * 2/1987 Fredkin .................. B01D 61/06
                                                    210/321.66

(Continued)

FOREIGN PATENT DOCUMENTS

| CN | 104495983 A | 4/2015 |
| GB | 2512057 A | 9/2014 |
| WO | 2017/010892 A1 | 1/2017 |

OTHER PUBLICATIONS

International Search Report for application No. PCT/US2018/026659 dated Jun. 20, 2018.

(Continued)

*Primary Examiner* — Richard C Gurtowski
(74) *Attorney, Agent, or Firm* — Artegis Law Group, LLP

(57) ABSTRACT

Embodiments of this invention provide an integrated system for clean energy generation and storage and RO desalination. The integrated system includes a first subsystem that stores hydraulic energy. The integrated system further includes a second subsystem that desalinates water. The integration system also includes a penstock that facilitates flow of the water between the first subsystem and the second subsystem. The integrated subsystem may also incorporate solar and/or wind power generation plants as a power source for the integrated system.

21 Claims, 5 Drawing Sheets

(51) Int. Cl.
   *B01D 61/10*   (2006.01)
   *C02F 103/10*   (2006.01)
   *C02F 1/32*   (2006.01)
   *C02F 1/66*   (2006.01)
   *C02F 103/08*   (2006.01)

(52) U.S. Cl.
   CPC .............. *B01D 61/10* (2013.01); *C02F 1/004* (2013.01); *B01D 2311/04* (2013.01); *B01D 2313/246* (2013.01); *B01D 2313/36* (2013.01); *B01D 2313/365* (2013.01); *C02F 1/32* (2013.01); *C02F 1/66* (2013.01); *C02F 2103/08* (2013.01); *C02F 2103/10* (2013.01); *C02F 2201/009* (2013.01); *C02F 2209/04* (2013.01); *C02F 2303/04* (2013.01); *C02F 2303/10* (2013.01); *Y02A 20/131* (2018.01); *Y02A 20/141* (2018.01); *Y02E 10/20* (2013.01); *Y02E 10/72* (2013.01); *Y02E 60/16* (2013.01); *Y02W 10/33* (2015.05); *Y02W 10/37* (2015.05)

(56) References Cited

U.S. PATENT DOCUMENTS

| | | | | |
|---|---|---|---|---|
| 5,004,535 | A | * | 4/1991 | Bosko ................... B01D 61/08 210/257.2 |
| 6,139,740 | A | * | 10/2000 | Oklejas ................ B01D 61/022 210/321.66 |
| 6,510,687 | B1 | | 1/2003 | Zaslavsky et al. |
| 2004/0258597 | A1 | * | 12/2004 | Michalakos .......... B01D 53/75 423/245.3 |
| 2005/0019154 | A1 | * | 1/2005 | Dial ......................... F01D 1/36 415/90 |
| 2005/0139530 | A1 | * | 6/2005 | Heiss ....................... C02F 9/00 210/85 |
| 2006/0157409 | A1 | | 7/2006 | Hassan |
| 2007/0181496 | A1 | | 8/2007 | Zuback |
| 2008/0296215 | A1 | | 12/2008 | Simon |
| 2014/0131280 | A1 | | 5/2014 | Haseneder et al. |

OTHER PUBLICATIONS

Slocum et al., "Integrated Pumped Hydro Reverse Osmosis systems", Sustainable Energy Technologies and Assessments 18, 2016, pp. 80-99.

International Search Report for application No. PCT/US2018/026702 dated Jun. 15, 2018.

Non-Final Office Action for U.S. Appl. No. 15/936,381, dated Aug. 16, 2019, 21 pages.

Final Office Action for U.S. Appl. No. 15/936,381, dated Jan. 29, 2020, 13 pages.

* cited by examiner

INTEGRATED SYSTEM FOR GENERATING, STORING AND DISPENSING CLEAN ENERGY AND DESALINATING WATER

CROSS-REFERENCE TO RELATED APPLICATIONS

This application claims benefit of United States Provisional Patent Application titled, "System Integrating Renewable Energy, Salt Water Pumped Hydroelectric Storage, and Reverse Osmosis Desalination," filed Apr. 10, 2017 and having Ser. No. 62/483,879, and claims benefit of United States Provisional Patent Application titled, "System Integrating Renewable Energy, Pumped Hydroelectric Storage, and Reverse Osmosis Desalination for Mine Development and Operations," filed Jun. 1, 2017 and having Ser. No. 62/513,845. The subject matter of these related applications are hereby incorporated herein by reference.

BACKGROUND OF THE INVENTION

Field of the Invention

Embodiments of the present invention relate generally to renewable energy and water desalination, and specifically, to an integrated system for generating, storing and dispensing clean energy and desalinating water.

Description of the Related Art

Many systems exist that enable the generation of clean energy. For example, photovoltaic cells may be implemented to generate electricity from sunlight. Also, wind turbines may be used to generate electricity from wind. Both types of energy generation techniques require the presence of an external energy source. In particular, photovoltaic cells rely on a present light source in order to provide energy on demand. Similarly, wind turbines rely on a wind source in order to harvest wind energy.

Due to the variability of sunlight and wind, neither photovoltaic cells nor wind turbines can consistently provide energy on demand. In particular, at night time, photovoltaic cells do not receive enough light to produce a consistent stream of energy. Even during daylight hours, solar energy is intermittent due to clouds and atmospheric interference that can radically impact the output of energy from photovoltaic cells. In addition, at various times of day and seasons of the year, there may not be enough wind in a wind farm to rotate wind turbines at a rate that produces a threshold amount of electrical energy.

Conventional solutions couple external energy storage devices to photovoltaic cells and wind turbines. External energy storage devices may include chemical energy storage (e.g., batteries), potential energy storage (e.g., capacitors). The electrical energy generated by the photovoltaic cells and/or wind turbines is transferred into chemical or potential energy. Thus, intermittently generated energy from photovoltaic cells and wind turbines can be stored in the external energy storage device and subsequently released to the grid on demand.

One drawback of these types of conventional solutions is that using an external storage device introduces additional complexity into a system. For example, maintaining connections between the external storage device and the energy generator may become a difficult design and present operational issues.

In addition, procuring drinking water is projected to be a major problem for the world in the next few decades. In particular, with the burgeoning world population, fresh water sources are not projected to meet the drinking water requirements of the global population. Reverse osmosis (RO) desalination is proposed as a way to convert high salinity water into potable drinking water. In RO desalination, pressurized seawater is passed through an ion-selective membrane. The membrane holds the solid contaminants on one side while the water passes through to the other end, separating seawater into brine and potable drinking water.

One drawback of the RO technique is that water must be pressurized before being passed through the ion-selective membrane to overcome natural osmotic pressures and effectively force water through membrane process. Accordingly, a large amount of energy is required in order to use RO desalination to significantly increase the available amount of potable drinking water. In addition, highly pressurized waste water known as brine is produced by the RO desalination subsystem. The brine needs to be properly disposed of in an environmentally safe manner and uphold environmental regulations.

As the foregoing illustrates, what is needed in the art are more effective techniques for generating and storing clean energy, as well as desalinating water.

SUMMARY OF THE INVENTION

One embodiment of the present invention sets forth an integrated system for clean energy generation and storage and RO desalination. The integrated system includes a first subsystem that generates and stores hydraulic energy. The integrated system further includes a second subsystem that desalinates water. The integration system also includes a penstock(s) that facilitates the flow of the water between the first subsystem and the second subsystem. In various embodiments, the integrated subsystem may also incorporate solar and/or wind power generation plants as a power source for the integrated system.

One advantage of the disclosed techniques is that the integrated system reduces the net cost of clean energy storage and seawater desalination in multiple ways. In terms of capital costs, the integrated system utilizes shared inflow-outflow structures, electrical grid connections, pipelines, and ancillary buildings, reduced pumps in the RO desalination process. In terms of operating costs, the integrated system reduces the energy inputs and consequently air emissions for the RO desalination subsystem. In addition, the environmental performance of these systems is improved by storing intermittently generated clean energy which may otherwise be curtailed or stored by other much more expensive means, and deploying stored hydraulic energy to drive the RO desalination subsystem.

Further advantages may also include mitigating the environmental impacts of the RO desalination process by diluting brine from the RO desalination subsystem with water being utilized for hydraulic energy production. Moreover, design risks are reduced by utilizing proven systems, including hydroelectric pump-turbines, motor-generators, penstocks, RO membranes, energy recovery devices, turbochargers, high pressure filtration equipment, and reservoirs, and solar and wind generation plants.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
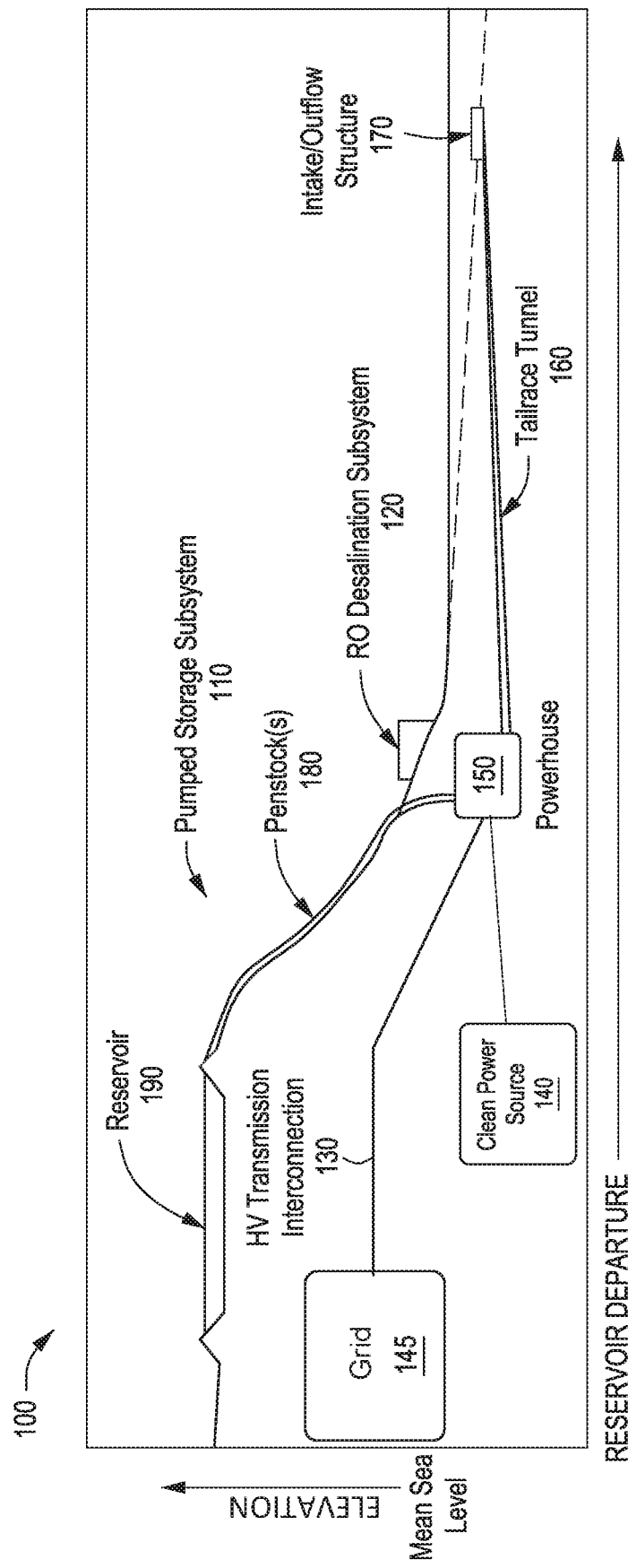
FIG. 1 is a conceptual illustration of an integrated system configured to implement one or more aspects of the present invention.

FIG. 1 is a conceptual illustration of an integrated system 100 configured to implement one or more aspects of the present invention. As shown, integrated system 100 includes, without limitation, high voltage transmission interconnections 130, a clean power source 140, a powerhouse 150, a tailrace tunnel 160, a seawater intake/outflow structure 170, a RO desalination subsystem 120, a penstock(s) 180, and a reservoir 190. For explanatory purposes, multiple instances of like objects are denoted with reference numbers identifying the object and parenthetical numbers identifying the instance where needed.

Pumped Storage Subsystem

In various embodiments, the power supply for the integrated system 100 may include an on-site or near-by clean energy source 140. Clean energy source 140 may include wind farms, solar farms, geothermal power plants, and so forth. Additionally or alternatively, the integrated system 100 may also be connected to a regional electricity grid during periods of low demand and low price and may further return energy to the grid when required. The grid 145 is a set of transformers, power lines, and substations that step up, carry, and step down electricity between power plants and transmits and distributes electricity to consumers. In various embodiments, integrated system 100 operates as a power plant supplying electricity to the grid 145. Additionally or alternatively, integrated system 100 operates as a consumer drawing electricity from the grid 145.

In various embodiments, high voltage transmission interconnections 130 coordinate the flow of electricity between the grid 145 and integrated system 100. For example, the high voltage transmission interconnections 130 may facilitate the flow of electricity to a powerhouse 150 in integrated system 100. This electricity may power a pump-turbine that pumps water from the ocean to a reservoir 190. In addition, the high voltage transmission interconnections 130 may coordinate the transmission of electricity generated by the integrated system 100 to the grid 145. For example, the high voltage transmission interconnections 130 may receive electricity generated by the pump-turbine and transmit that electricity to the grid 145.

The per-unit cost of electricity supplied by the grid 145 may depend on various parameters, including weather conditions, state and federal regulations, the instantaneous condition of various transmission and distribution systems, the conditions of each power plant, and the per-unit cost of fuel required by the power plant. Accordingly, the per-unit cost of electricity may vary throughout a given period of time throughout the day and the year. In some embodiments, integrated system 100 is configured to draw electricity from the grid 145 when the per-unit cost of electricity is low. In addition, the integrated system 100 may return electricity to the grid 145 when the per-unit cost of electricity is high, thereby resulting in a net profit.

The powerhouse 150 coordinates the supply of electricity to various subsystems within the integrated system 100. In particular, the powerhouse 150 supplies electricity to the pump-turbine for pumping seawater through the penstock 180 to the reservoir 190. Additionally, the power plant operates as a pass through for electricity generated by the pump-turbines. In particular, when water flows down the penstock 180, the water rotates the turbines, thereby generating electrical energy. The energy passes thorough the powerhouse 150 to the high voltage interconnections 130 in order to supply electricity to the grid 145.

The intake/outflow structure 170 facilitates the flow of seawater into the integrated system 100. In addition, the intake/outflow structure 170 facilitates the flow of water out of the integrated system 100 to the ocean. The intake/outflow structure 170 may include one or more mesh structures that filter out debris as the seawater enters the intake/outflow structure 170. The mesh structures may be designed modularly in order to be easily replaceable. For example, each mesh may have two or more filtration areas. The meshes may then be stacked next to and/or on top of each other in a manner that allows water to flow through the filtration areas of each mesh. Accordingly, the cross-sectional area through which water is filtered may be increased or decreased by adding or removing mesh structures. In addition, mesh structures may be added and removed without compromising the performance of the intake/outflow structure 170. For example, each mesh structure may include mesh filters on multiple sides of the mesh structure. Thus, when a mesh structure is removed, seawater may enter and/or exit the integrated system 100 via one or more of the remaining mesh structures. In some embodiments, each mesh structure is coated with a substance that causes debris to not adhere to the surface of the mesh structure. Applying a coating may increase the useful lifetime and reduce the maintenance requirements of the mesh structures.

The tailrace tunnel 160 facilitates the flow of water from the intake/outflow structure 170 into the integrated system 100. In some embodiments, the tailrace tunnel 160 may be located at or below the mean sea level of the water source. The tailrace tunnel 160 facilitates the flow of water between the intake/outflow structure 170 and the pump-turbine 290.

In various embodiments, the reservoir 190 stores seawater at an elevated location above the mean sea level. Elevating the water above the mean sea level converts electrical energy into gravitational potential energy. In particular, the pump-turbine is driven by a motor-generator that is powered by the grid 145 or the clean energy source 140, when available. The potential energy can be harvested as the water is released through the integrated system 100 and returns to the ocean. The reservoir 190 is lined with a non-permeable membrane that prohibits the flow of water between the reservoir 190 and the surrounding environment. Accordingly, the lining may protect the surrounding environment from the saline seawater. The non-permeable membrane may include geo-textile fabrics, reinforced polypropylene, and so forth.

The penstock(s) 180 is a water conveyance pipeline that facilitates the flow of water between a water source (e.g., an ocean) and the reservoir 190. In addition, the penstock 180 facilitates the flow of seawater to the RO desalination subsystem 120. Waste water (i.e., brine) from the RO desalination subsystem 120 is mixed with seawater flowing down the penstock 180 and released back into the water source via the intake/outflow structure 170. The penstock 180 may be constructed out of various types of metals. The thickness of the penstock 180 may vary along the length of the penstock 180. For example, the penstock 180 may be thicker at the base of the penstock 180 and thinner at the top of the penstock 180. In particular, the thickness of the penstock 180 may be determined based on an expected amount of force applied by the water on the penstock 180.

In some embodiments, the penstock 180 may be constructed out of fiber-reinforced plastics to reduce corrosion from seawater and to reduce biofouling (e.g., adhesion of barnacles to the inner walls of the penstock 180). In addition, the penstock 180 may include antifouling coatings to reduce the build-up of materials on the inner surface of the penstock 180, in addition to anti-corrosion coatings. Using antifouling coatings and anti-corrosion materials may reduce the upkeep costs of maintaining the penstock 180, while also extending the lifetime of a penstock 180.

In various embodiments, the pump-turbine pumps seawater through the penstock 180 and into the reservoir 190. In particular, the pump-turbine pressurizes the seawater to up to a threshold pressure value before releasing the pressurized seawater into the penstock 180. For example, the pump-turbine may pressurize the seawater to up to 400 pounds per square inch (psi) or more. In addition, the pump-turbine converts energy in water flowing down the penstock 180 into electrical energy via a motor-generator. In various embodiments, the pump-turbine is connected to a motor-generator via a shaft. The motor-generator includes a rotor connected to the shaft and a stator disposed about the rotor. Rotating the rotor generates a time-varying magnetic field produced between the rotor and the stator. The time-varying magnetic force produces an electric current in the stator. Accordingly, as the seawater flows through the pump-turbine, the kinetic energy in the seawater is converted into electricity that is transmitted to the grid 145.

In some embodiments, the pump-turbine may be constructed out of stainless steel. The stainless steel may be coated to protect against corrosion from contact with seawater and to reduce biofouling on the blades of the pump-turbines. In various embodiments, each penstock 180 may be connected to one or more pump-turbines. Additionally or alternatively, each pump-turbine may be connected to one or more penstocks 180.

In various embodiments, the penstock 180 includes a T-piece 210 that regulates the flow of seawater in the penstock 180 to the RO desalination subsystem 120. In addition, a discharge valve 270 controls the release of brine from the RO desalination subsystem 120 into the tailrace tunnel 160 for release into the water source. The operation of the RO desalination subsystem 120 is discussed in detail below.

RO Desalination Subsystem

The RO desalination subsystem 120 uses reverse osmosis to generate potable drinking water from high salinity water (e.g., seawater.). In particular, the RO desalination subsystem 120 includes an energy recovery turbocharger, a RO unit 240 that includes one or more ion-selective membranes, a brine tank, a discharge valve, and a clear well 250. In operation, seawater from the penstock 180 is diverted into the RO desalination subsystem 120 via a T-piece 210. The T-piece 210 controls the amount of water supplied to the RO desalination subsystem 120.

When the seawater enters the desalination subsystem, the seawater passes through one or more filters to remove small debris and the energy recovery turbocharger pressurizes the seawater to 700 psi or more. The filtered water is released into the RO unit 240. In the RO unit 240, the water passes through ion-selective membranes that separate filtered seawater into brine and potable water. The potable water flows out of the RO unit at low pressure, is disinfected and chemically stabilized before proceeding to a clear well 250 to ensure adequate treatment chemical contact time, from where it is conveyed to the local water distribution system.

In addition, the brine outputted from the RO unit 240 is highly pressurized. Accordingly, the brine passes through an energy recovery turbocharger that captures embedded energy in the brine discharge flows. The brine is released to the brine tank 260. In various embodiments, the energy recovery turbocharger 230 includes a pressure exchange that uses the pressure energy of the pressurized brine to pressurize the filtered seawater entering the energy recovery turbocharger 230. Accordingly, less energy is needed to pressurize the filtered water in the energy recovery turbocharger 230.

In addition, a discharge valve controls the flow of brine from the brine tank into the tailrace tunnel 160. For example, the discharge valve 270 may be in a feedback loop with a diffuser downstream of the discharge valve 270. Accordingly, the discharge valve may increase or decrease the flow rate of brine into the tailrace tunnel 160 based on the salinity of the seawater measured by the diffuser 280.

Operation of Integrated System

The integrated system 100 operates in various operational cycles. In particular, the integrated system 100 may operate in a charging cycle, a generation cycle, and an idle cycle. Each operational cycle corresponds to a different stage of a clean energy storage and generation cycle. In particular, in the charging cycle, the integrated system 100 draws energy from the grid 145 in order to pump water from ocean to the elevation of the reservoir 190. The charging cycle enables hydraulic storage of energy from the grid 145. In the generation cycle, water flows from the elevation of the reservoir 190 to mean sea level. A pump-turbine converts the kinetic energy of the water into electricity that can be supplied to the grid 145. Finally, in the idle cycle, the integrated system 100 neither elevates water from mean sea level to the elevation of the reservoir 190 nor allows water to flow from the elevation of the reservoir 190 to the ocean. Accordingly, electricity is not converted from the grid 145 into hydraulic energy nor is power generated by the integrated system 100.

As discussed above, the integrated system 100 also includes the RO desalination subsystem 120. The RO desalination subsystem 120 is coupled to the pumped storage subsystem 110 via the penstock(s) 180. In particular, the RO desalination subsystem 120 draws water from the penstock 180 via a T-piece 210. For example, the T-piece may include a regulator that controls the flow of water between the penstock 180 and the RO desalination subsystem 120.

In addition, the RO desalination subsystem 120 releases brine into the tailrace tunnel 160 for re-introduction into the environment at a blended rate that achieves near ambient salinity levels. The RO desalination subsystem 120 includes a discharge valve that controls the flow of brine from the brine tank into the tailrace tunnel 160. The discharge valve 270 may be configured to remain closed during the charging cycle and the idle cycle in order to reduce the likelihood of brine being re-introduced into the RO desalination subsystem 120 via the penstock 180. The discharge valve 270 may open during the generation cycle when large amounts of water flows through the tailrace and out of the intake/outflow structure 170. As described above, the discharge valve 270 controls the flow of brine into the tailrace tunnel 160 to not exceed regulatory salinity standards.

Figure 2:
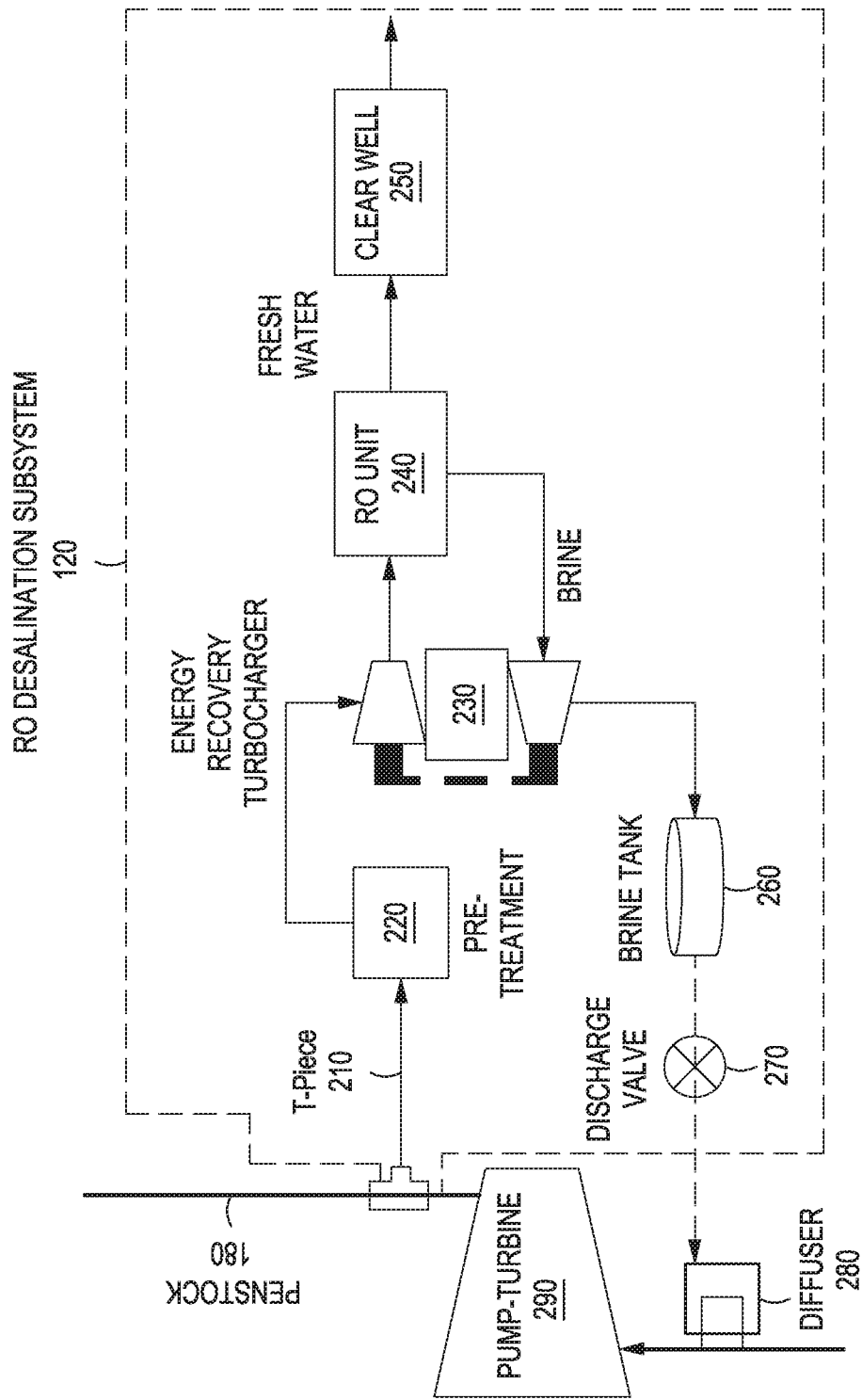
FIG. 2 sets forth a more detailed illustration of the RO desalination subsystem incorporated in the integrated system of FIG. 1, according to various embodiments of the present invention.

FIG. 2 sets forth a detailed illustration of the RO desalination subsystem 120 of FIG. 1, according to various embodiments of the present invention. As shown, the RO desalination subsystem 120 includes a T-piece 210, a pre-treatment module 220, an energy recovery turbocharger 230, a RO unit 240, a clear well 250, a brine tank 260, a discharge valve 270, and a diffuser 280.

The T-piece 210 regulates the flow of water from the penstock 180 into the RO desalination subsystem 120. In various embodiments, the T-piece 210 may be located at the base of the penstock 180. In addition, the T-piece 210 may be rated for various threshold water pressure values. For example, the T-piece 210 may be designed for water pressurized up to 600 psi. Other threshold values are within the scope of this invention. For example, the T-piece 210 may be rated for up to 400 psi or up to 600 psi. In particular, the T-piece 210 is designed to withstand a water pressure threshold that exceeds the pressure of water exiting the pump-turbine 290.

Furthermore, the T-piece 210 may include a regulator that controls the flow of water through the T-piece 210. The regulator diverts pressurized seawater into the RO desalination subsystem 120 at a particular flow rate, while the remainder of the pressurized seawater enters the penstock 180 and flows into the reservoir 190. In particular, the T-piece 210 is connected via a seawater feed pipeline to a pre-treatment module 220. The regulator in the T-piece 210 diverts water to the RO desalination subsystem 120 at a flow rate that matches the steady state desalination rate at which the RO desalination subsystem 120 operates. The RO desalination subsystem 120 may be rated to receive water flow at a rate of 50 liters per second to up to 5,000 liters per second or more.

In addition, the T-piece 210 may include various types of filters that remove debris from the pressurized seawater. For example, the T-piece 210 may include a fish screen that filter out debris from the pressurized seawater. In various embodiments, the fish screen, inner surface of the penstock 180, the T-piece 210, and the other elements of the integrated system 100 may by coated with antifouling and anticorrosive coatings.

The pre-treatment module 220 receives water from the seawater feed pipeline. The pre-treatment module 220 includes a series of increasingly fine filters that remove debris from the water passing through the pre-treatment module 220, including strainers, filters and ultra-fine filters.

The pre-treatment module 220 may include chemical treatment and ultra-violet disinfection stages of water. The chemical treatment process may include adding acids, caustics, dechlorination chemicals, and antiscalants and dispersants to the water. Acids may be used to reduce the pH of the water. Example acids may include sulfuric acid and hydrochloric acid. Additionally or alternatively, caustics may be used to increase the pH of the water. For example, sodium hydroxide may be introduced in the water to increase the pH of the water. Dechlorination chemicals may be used to remove free chlorine residual in the water. Removing free chlorine from the water may reduce the likelihood of oxidation damage on filtration membranes. In addition, antiscalants may be used to inhibit the formation and precipitation of crystallized mineral salts that may form in the water, while dispersants may be used to inhibit the agglomeration and deposition of foulants on filtration membranes. In addition, ultraviolet treatment may be used for sterilization of the water. For example, ultraviolet treatment may be used to kill algae and reduce algae deposit formation in the water.

As the water passes through the pre-treatment module 220, the filtration causes the water to reduce pressure. For example, water may enter the pre-treatment module 220 at 400 psi. When the water exits the pre-treatment module 220, pressure of the water may decrease by 10%. The filtered seawater exits the pre-treatment module 220 and flows through the seawater feed pipeline to the energy recovery turbocharger 230.

The energy recovery turbocharger 230 receives the filtered seawater and increases the pressure of the filtered seawater. The pressurized seawater is released to the RO unit 240. In some embodiments, the energy recovery turbocharger 230 increases the pressure of the water between 200 and 1000 psi. For example, water may enter the energy recovery turbocharger 230 at approximately 400 psi. The energy recovery turbocharger 230 may pressurize the water up to approximately 800 psi before releasing the water into the RO unit 240. In various embodiments, the energy recovery turbocharger 230 increases the pressure of the water to up to 1000 psi.

In addition, the energy recovery turbocharger 230 receives pressurized brine from the RO unit 240. The energy recovery turbocharger 230 passes the pressurized brine through a pressure exchanger. In one embodiment, the pressure exchanger includes a rotor that is physically connected to a shaft. The rotor converts the pressure energy of the water into mechanical rotational energy of the shaft. The shaft is further connected to a second rotor. When the pressurized brine flows through the pressure exchanger, the pressurized brine rotates the shaft, which causes the second rotor to rotate. The water flowing into the energy recovery turbocharger 230 passes through the second rotor, thereby increasing the pressure of the water flowing into the energy recovery turbocharger 230. Accordingly, the energy recovery turbocharger 230 uses a pressure exchanger to harvest the pressure of the pressurized brine to increase the pressure of water flowing into the energy recovery turbocharger 230.

In addition, the energy recovery turbocharger 230 may include one or more additional pumps to further increase the pressure of the water flowing into the energy recovery turbocharger 230 up to a threshold pressure before releasing the water into the RO unit 240. For example, the additional pumps may further increase the pressure of the filtered seawater to up to 800 psi or more.

In various embodiments, RO unit 240 may include one or more ion-selective membranes that filter out particulates from the water exiting the energy recovery turbocharger 230. The resulting fresh water permeate may be disinfected and chemically stabilized before being released into a clear well 250. In some embodiments, 40% of the water that flows into the RO unit 240 flows out of the RO unit 240 as fresh water permeate. In other embodiments, 20% to 60% of the water flowing into the RO unit 240 may be released as fresh water permeate. In addition, approximately 60% of the water flowing into the RO unit 240 may be released as brine concentrate. However, in other embodiments, 30% to 80% of the water flowing into the RO unit 240 may be released as brine concentrate. In various embodiments, the brine concentrate may exit the RO unit 240 at a similar pressure to the pressure of water flowing into the RO unit 240. For example, water may flow into the RO unit 240 at 800 psi and brine concentrate may flow out of the RO unit 240 between 700-800 psi.

After passing through the energy recovery turbocharger 230, the brine may enter a brine tank 260. In various embodiments, the brine tank 260 is sized to store 12-72 hours of brine outputted by the RO unit 240. The brine tank 260 may be connected to a discharge valve 270 that controls the rate at which brine from the RO unit 240 enters the tailrace tunnel 160. In various embodiments, the discharge valve 270 is connected to the tailrace tunnel 160. When the discharge valve 270 is open, water flows from the brine tank 260 into the tailrace tunnel 160. However, when the discharge valve 270 is closed, brine remains in the brine tank 260.

In various embodiments, a diffuser 280 located downstream of the discharge valve 270 may test the salinity of the seawater flowing out of the tailrace tunnel 160 and further compare the salinity of the outflow to regulatory salinity limits. The diffuser 280 may be in a feedback loop with the discharge valve 270. Furthermore, the discharge valve 270 may adjust the flow rate of brine entering the tailrace tunnel 160 based on the salinity test results determined by the diffuser 280. For example, if the salinity of the outflow water at the diffuser 280 is below regulatory salinity limits, then the diffuser 280 may trigger the discharge valve 270 to increase the flow rate of brine flowing into the tailrace tunnel 160. In addition, if the salinity of the outflow water is at or above the regulatory salinity limits, the diffuser 280 may trigger the discharge valve 270 to maintain or reduce the flow rate of brine into the tailrace tunnel 160, respectively.

In various embodiments, the reservoir 190 is sized to store 10 MW to 1,000 MW. For example, the reservoir 190 may be sized to store 300 megawatts of seawater. In other embodiments, multiple smaller reservoirs 190 may be utilized. Each reservoir 190 may be connected to separate penstocks 180. Each penstock 180 may have a cross-sectional width between 10 and 50 ft. A T-piece 210 may be connected to the base of the penstock 180, above the pump-turbine 290. The regulator within the T-piece 210 may direct between 50 liters per second and 5,000 liters per second of pressurized seawater into the RO desalination subsystem 120. In some embodiments, each penstock 180 may be connected to a separate RO desalination subsystem 120. In other embodiments, multiple penstocks 180 may connect to a single RO desalination subsystem 120. In addition, a single penstock 180 may supply pressurized seawater to multiple RO desalination subsystems 120.

Figure 3:
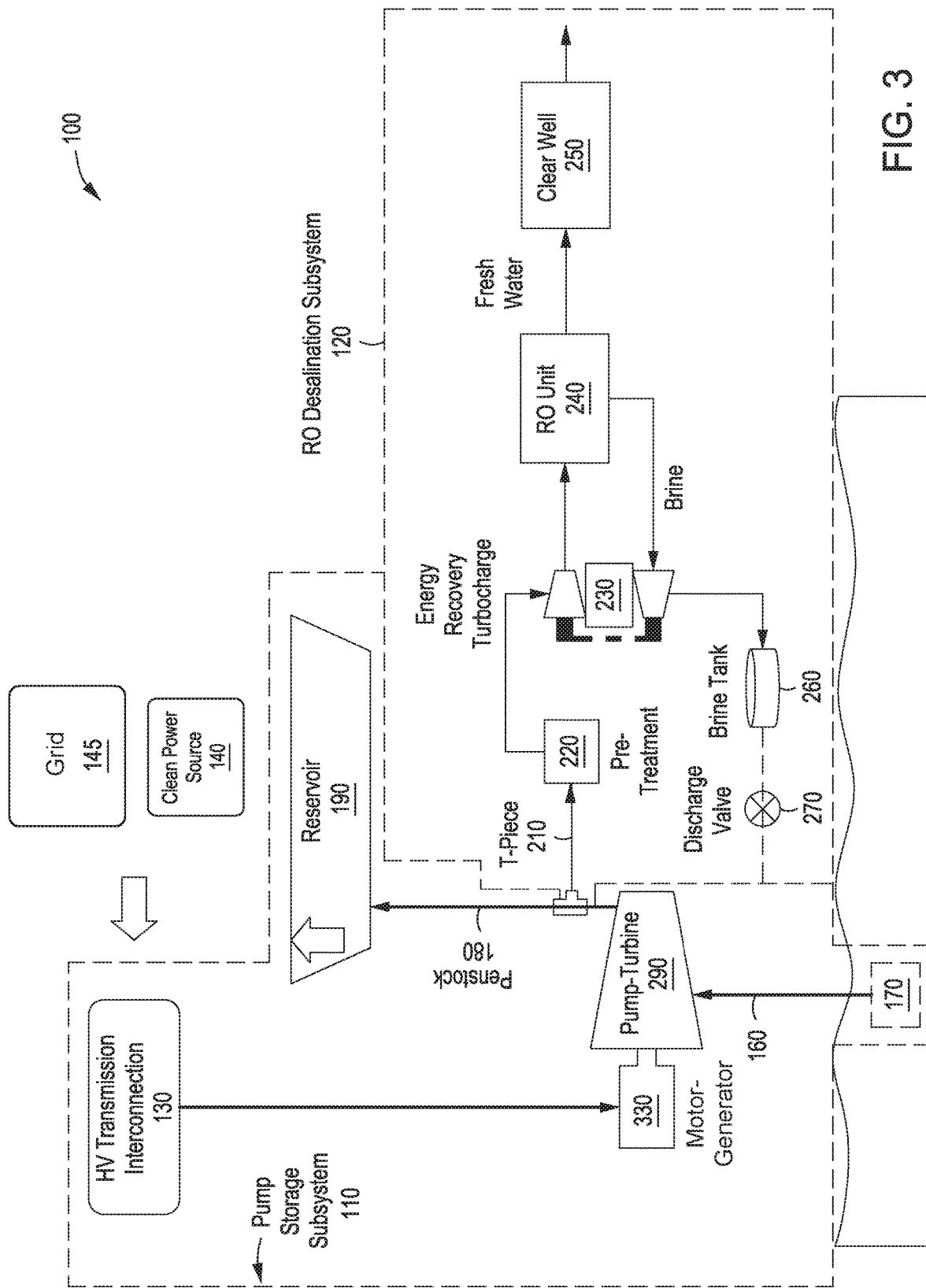
FIG. 3 sets forth an exemplary illustration of the integrated system of FIG. 1 in the charging cycle, according to various embodiments of the present invention.

FIG. 3 sets forth an exemplary illustration of the integrated system 100 of FIG. 1 operating in the charging cycle, according to various embodiments of the present invention.

In the charging cycle, the integrated system 100 draws energy from the grid 145 and/or the clean energy source 140, when available, in order to pump water from the ocean to the reservoir 190. The charging cycle enables hydraulic storage of energy from the grid 145.

In various embodiments, a local clean energy source 140 may be constructed proximate to the integrated system 100. For example, a wind farm, a solar farm, and/or a geothermal power plant may be constructed proximate to the integrated system 100. The type of clean energy source 140 may be selected based on the regional availability of the associated energy source. For example, if strong winds are present, then a wind farm may be constructed on-site and/or nearby the integrate system 100. Similarly, if extended periods of sunlight are present, then a solar farm may be constructed on-site and/or nearby the integrated system 100.

In embodiments that include the local clean energy source 140, during the charging cycle, the powerhouse 150 may selectively draw power from the local clean energy source 140, the grid 145, or both. For example, when the local clean energy source 140 is generating power, the powerhouse 150 may select to draw power from the local clean energy source 140. However, during periods of low power production by the local clean energy source 140, the powerhouse 150 may draw power from the grid 145 to meet the energy requirements of the motor-generator 330. Similarly, the RO desalination subsystem 120 may draw power from the local clean energy source 140 and, during times of intermitted or low power production, may additionally draw power from the grid 145.

In various embodiments, the seawater flows through a tailrace tunnel 160 to a pump-turbine 290. The pump-turbine 290 operates in a pump cycle drawing seawater through the tailrace tunnel 160 and pressurizing the seawater. The pump-turbine 290 is connected to a motor-generator 330 that rotates the pump-turbine 290. Electricity is supplied to the motor-generator 330 via a grid 145 and/or the clean energy source 140. Rotating the pump-turbine 290 exerts a centripetal force on the seawater that pressurizes the seawater. The seawater is pressurized in order to cause the seawater to flow against the force of gravity into a reservoir 190 located above the pump-turbine 290. In particular, the pump-turbine 290 may pressurize the seawater up to a pressure threshold. For example, the pump-turbine 290 may pressurize the seawater up to 400 psi. However, the pump-turbine 290 may pressurize the seawater up to a higher or lower pressure value. For example, the pressure threshold may be 300-600 psi. In addition, a variable speed pump-turbine 290 may be implemented. Accordingly, the pump-turbine 290 may be configured to pressurize the seawater up to different pressure thresholds during the charging cycle.

The water is released into the penstock 180. As discussed above, the T-piece 210 including a regulator is located at the base of the penstock 180. The regulator diverts water into the RO desalination subsystem 120. In various embodiments, the regulator may divert between 50 and 5,000 liters of water per second into a seawater feed pipeline that connects the T-piece 210 to a pre-treatment module 220 located within the RO desalination subsystem 120. In some embodiments, a penstock 180 may supply water to multiple RO desalination subsystems 120. In other embodiments, multiple penstocks 180 may supply water to a single RO desalination subsystem 120.

The water in the penstock 180 that is not diverted into the RO desalination subsystem 120 flows up the penstock 180 into a reservoir 190. The reservoir 190 is lined to prevent seawater from leaking into the surrounding area. The reservoir 190 stores the seawater throughout the charging cycle. In various embodiments, the reservoir 190 may be sized to store sufficient amounts of water to provide 10-1000 MW of hydroelectric power or more. In other embodiments, multiple reservoirs 190 may be implemented in conjunction. In addition, multiple penstocks 180 may supply seawater to a single reservoir 190 and/or a single penstock 180 may supply seawater to multiple reservoirs 190.

The water that enters the RO desalination subsystem 120 passes through a pre-treatment module 220. In the pre-treatment module 220, particulates are filtered out of the water by a combination of strainers, filtration, and ultra-filtration. In addition, the water is chemically treated to control the pH of the water and to reduce the formation of crystalline deposits in the water. In addition, the water may be treated with ultra-violent light to kill algae and other biological agents in the water. In various embodiments, the water decreases in pressure when flowing through the pre-treatment module 220. For example, the water may lose 10% of pressure.

The pre-treatment module 220 outputs filtered water that enters an energy recovery turbocharger 230. The energy recovery turbocharger 230 includes one or more sets of rotors that pressurize the filtered water up to 700-1000 psi or more. The water flows into a RO unit 240. The RO unit 240 includes ion-selective membranes that filter out nanometer-sized particles from the water. In various embodiments, the water depressurizes as it passes through the ion-selective membranes and low pressure fresh water flows out of the RO unit 240. The fresh water may be chemically stabilized before being released into a local clear well 250. In various embodiments, approximately 40% of the water flowing into the RO unit 240 flows out of the RO unit 240 as fresh water.

In addition, approximately 60% of the water flowing into the RO unit 240 is filtered out and released as pressurized brine. The pressurized brine includes particulates filtered out by the ion-selective membranes in the RO unit 240. The pressurized brine flows into a pressure exchanger in the energy recovery turbocharger 230. The pressure exchanger converts the pressure energy of the pressurized brine into mechanical energy that rotates a shaft. The brine further flows into a brine tank 260. In various embodiments, the brine tank 260 is sized to store 12-72 hours of brine outputted from the RO unit 240. In some embodiments, multiple brine tanks 260 may be connected to the energy recovery turbocharger 230 in order to increase the total brine storage capacity of the RO desalination subsystem 120. In addition, a discharge valve 270 controls the flow of brine out of the brine tank 260 and into the tailrace tunnel 160. During the charging cycle, the discharge valve 270 remains closed.

In various embodiments, the pressure exchanger depressurizes the pressurized brine by converting the pressure energy of the pressurized brine into mechanical energy via a rotor. The rotor is connected to a shaft and the shaft is connected to a second rotor. In various embodiments, the filtered water flowing into the energy recovery turbocharger 230 is pressurized by the second rotor. For example, filtered water flowing out of the pre-treatment module 220 may have a pressure of 400 psi and the pressurized brine flowing out of the RO unit 240 may have a pressure of 780 psi. As the filtered water flows over the second rotor, the filtered water may be pressurized up to 800 psi. Similarly, as the pressurized brine flows through the first rotor, the pressurized brine may be depressurized to 20 psi. Accordingly, the pressure exchanger may reduce the amount of power required to increase the pressure of the filtered water to a threshold pressure value before the filtered water enters the RO unit 240.

Figure 4:
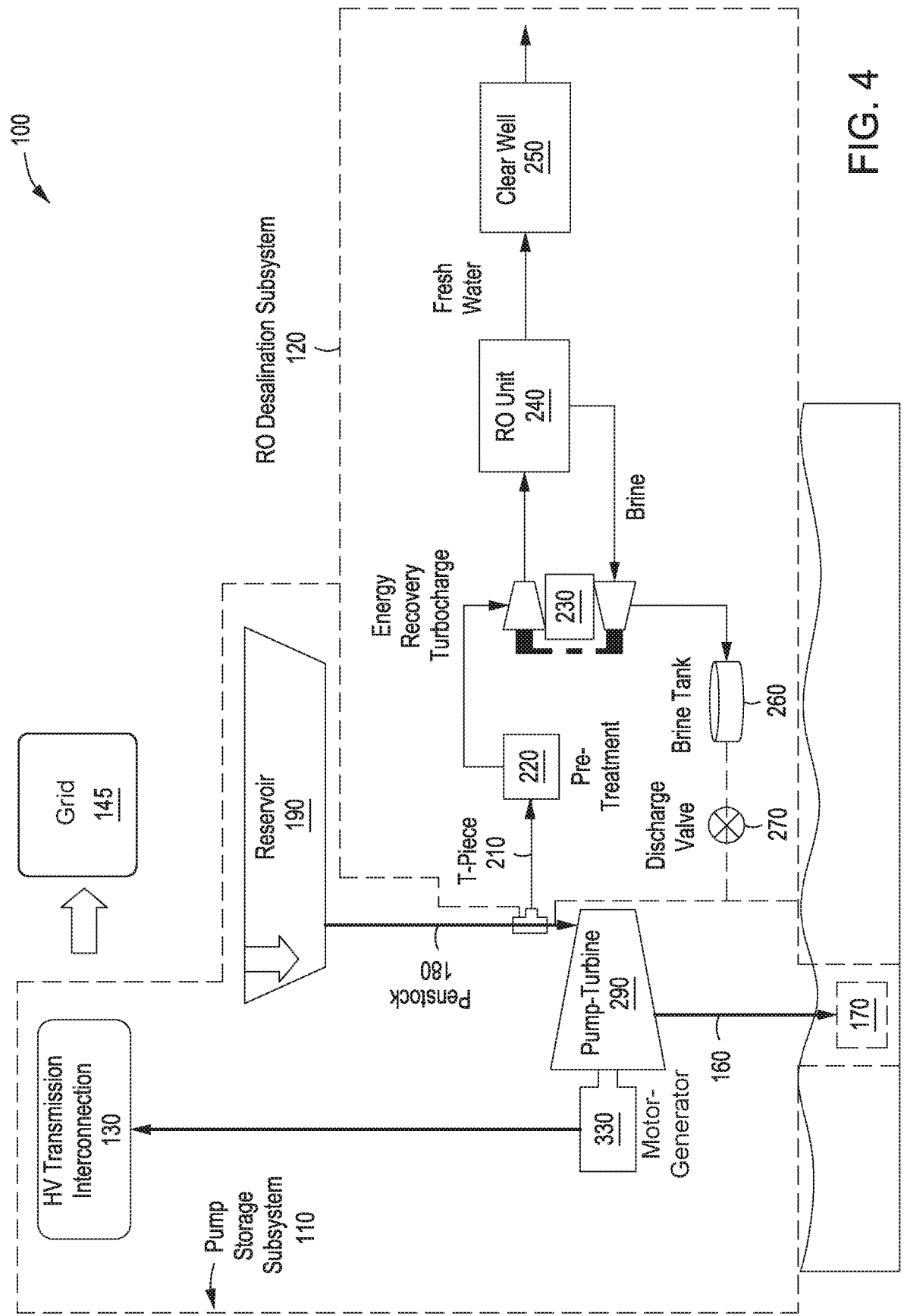
FIG. 4 sets forth an exemplary illustration of the integrated system of FIG. 1 in the generation cycle, according to various embodiments of the present invention.

FIG. 4 sets forth an exemplary illustration of the integrated system 100 of FIG. 1 operating in the generation cycle, according to various embodiments of the present invention. In the generation cycle, water flows from the elevation of the reservoir 190 to mean sea level. A pump-turbine 290 converts the kinetic energy of the water into electricity that can be supplied to the grid 145.

In the integrated system 100, seawater flows out of the reservoir 190 and into a penstock 180. In the generation cycle, the pump-turbine 290 may be reverse to allow water to flow down the penstock 180, through the pump-turbine 290, and into the tailrace tunnel 160. As the seawater flows down the penstock 180, the potential energy in the seawater is converted to kinetic energy. Accordingly, the kinetic energy of the seawater rotates the turbine as the seawater flow through the pump-turbine 290. Rotating the turbine rotates a rotor within the motor-generator 330. The motor-generator 330 further converts the mechanical energy of the rotating turbine into electricity. The electricity produced by the motor-generator 145 may be sold to the grid 145. In various embodiments, the seawater further flows through the tailrace tunnel 160, through the intake/outflow structure 170, and back into the water source (e.g., the ocean).

In various embodiments, the T-piece 210 includes a regulator that diverts water flowing down the penstock 180 into the seawater feed pipeline and into the pre-treatment module 220. The regulator may divert 50 to 5,000 liters of water per second into the RO desalination subsystem 120 via the seawater feed pipeline.

In various embodiments, during the generation cycle, the discharge valve 270 may be open to allow brine in the brine tank 260 to flow into the tailrace tunnel 160. The discharge valve 270 controls the rate at which brine flows into the tailrace tunnel 160. In particular, a diffuser 280 downstream of the discharge valve 270 measures the salinity of seawater flowing out of the integrated system 100. The diffuser 280 may be in a feedback loop with the discharge valve 270. In particular, the diffuser 280 may configure the discharge valve 270 to increase or decrease the flow rate of brine into the tailrace tunnel 160 to empty the brine tank 260, while maintaining local environment water salinity standards.

Figure 5:
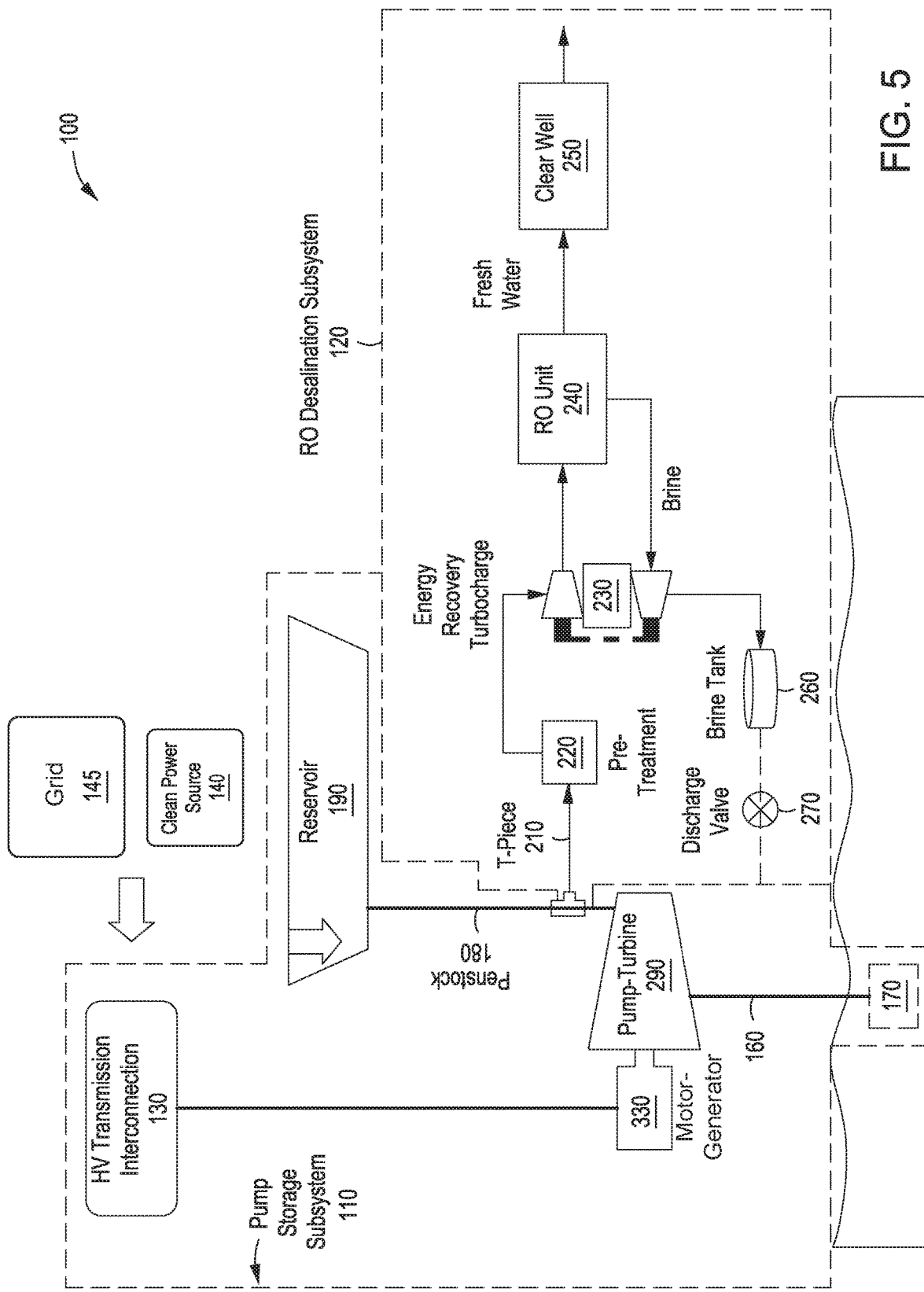
FIG. 5 sets forth an exemplary illustration of the integrated system of FIG. 1 in the idle cycle, according to various embodiments of the present invention.

FIG. 5 sets forth an exemplary illustration of the integrated system 100 of FIG. 1 operating in the idle cycle, according to various embodiments of the present invention. In the idle cycle, the integrated system 100 neither pumps water from the ocean to the reservoir 190 nor allows water the flow from the reservoir 190 through the pump-turbine 290. In particular, the pump-turbine 290 is shut off and seawater does not pass through the pump-turbine 290.

However, the RO desalination subsystem 120 may continue to operation. In particular, the regulator in the T-piece 210 may allow seawater to flow from the penstock 180 into the RO desalination subsystem 120. In addition, the discharge valve 270 is closed. Accordingly, brine flowing from the energy recovery turbocharger 230 remains in the brine tank 260 and does not flow out to the tailrace tunnel 160. In particular, the brine tank 260 may be sized to store 12-72 hours of brine released by the energy recovery turbocharger 230. Accordingly, the RO desalination subsystem 120 may continue to operate for extended periods of time between generation cycles.

In some embodiments, the integrated system 100 may transition to the idle cycle from either the charging cycle or the generation cycle at fast response times of less than 5 minutes. Accordingly, when the pump-turbine 290 is shut off, the sea water flowing through the penstock 180 may exert a significant force on the sides of the penstock 180. In particular, as stated above, the seawater may exert more force on the base of the penstock 180 than at the top of the penstock 180. Thus, the penstock 180 may be constructed to be thicker at the base of the penstock 180 than at the top of the penstock 180 in order to mitigate the force exerted by the seawater. For example, the penstock 180 may be constructed by connecting two or more sections, where the sections closer to the base of the penstock 180 are thicker or otherwise re-enforced in comparison to sections toward the top of the penstock 180.

In sum, the disclose integrated system provides clean energy sources that can supply electricity to the grid in addition to supplying seawater to a Reverse Osmosis (RO) desalination subsystem. In particular, the integrated system operates in three cycles: a charging cycle, a generating cycle, and an idle cycle. In the charging cycle, the integrated system receives electricity from the grid. The electricity is used to pump water up a penstock to a lined and sealed water storage area. In addition, some of the water is diverted to the RO desalination subsystem for desalination. The waste water from the RO desalination subsystem is held in a brine tank, while the fresh water is dispensed to a clear well.

In the generating cycle, the pump is reversed and acts as a turbine. In particular, water from the reservoir flows down the penstock 180 and through a pump-turbine operating in a turbine mode. The kinetic energy of the water rotates the turbines. The turbines are connected to a motor-generator. Accordingly, rotating the turbines generates electricity that is transmitted to the grid. In addition, as water travels down the penstock, some water is diverted into the RO desalination subsystem for desalination. In various embodiments, the brine stored in the brine tank is mixed with large amounts of seawater traveling down the penstock. The mixing ratios may be determined to meet the near ambient salinity levels of the source water in addition to meeting local regulations and environmental conditions.

In the idle cycle, water is supplied to the RO desalination subsystem for desalination. In addition, brine is held within the brine tank. Furthermore, the pump-turbine is non-active.

Advantageously, the integrated system reduces the net cost of clean energy storage and seawater desalination by utilizing shared inflow-outflow structures, electrical grid connections, and ancillary buildings. In addition, the environmental performance of these systems is improved by deploying stored hydraulic energy to drive the RO desalination subsystem, thereby reducing the horsepower requirements of the pump-turbine in pumping water into the RO desalination subsystem. Moreover, design risks are reduced by utilizing proven systems, including hydroelectric pump-turbines, high pressure filtration equipment, and reservoirs.

1. In some embodiments, an integrated system for clean energy storage and generation and reverse osmosis (RO) desalination comprises: a first subsystem that stores hydraulic energy; a second subsystem that desalinates water; and a penstock that facilitates flow of the water between the first subsystem and the second subsystem.

2. The integrated system of clause 1, further comprising a third subsystem that provides clean energy to at least one of the first subsystem and the second subsystem.

3. The integrated system of clauses 1 or 2, wherein the first subsystem comprises: a reservoir that stores water; and a pump-turbine that pumps water through the penstock and into the reservoir.

4. The integrated system of any of clauses 1-3, wherein the first subsystem further comprises a tailrace that facilitates flow of the water from an intake/outflow structure coupled to a water source to the pump-turbine, and wherein the intake/outflow structure includes multiple mesh structures that filter water.

5. The integrated system of any of clauses 1-4, wherein the pump-turbine is coupled to a motor-generator that generates electricity or consumes electricity.

6. The integrated system of any of clauses 1-5, wherein, when water flows from the reservoir and through the penstock, the water rotates the pump-turbine causing the motor-generator to generate electricity.

7. The integrated system of any of clauses 1-6, wherein the electricity generated by the motor-generator is released to the grid.

8. The integrated system of any of clauses 1-7, wherein a pre-treatment module filters water flowing into the second subsystem and outputs filtered water.

9. The integrated system of any of clauses 1-8, wherein an energy recovery turbocharger pressurizes the filtered water and outputs the pressurized filtered water.

10. The integrated system of any of clauses 1-9, wherein the second subsystem includes a RO unit that filters the pressurized filtered water through one or more ion-selective membranes and outputs pressurized waste and depressurized potable water.

11. The integrated system of any of clauses 1-10, wherein the pressurized brine is released to the energy recovery turbocharger.

12. The integrated system of any of clauses 1-11, wherein the energy recovery turbocharger further comprises a pressure exchanger, wherein the pressurized waste is depressurized by passing the pressurized brine through a first rotor of the pressure exchanger.

13. The integrated system of any of clauses 1-12, wherein the depressurized brine is stored in a brine tank, and a discharge valve controls an exit flow of the brine from the brine tank.

14. The integrated system of any of clauses 1-13, wherein the filtered water passes through a second rotor of the pressure exchanger that is connected to the first rotor by a shaft, wherein the filtered water is pressurized by the second rotor.

15. The integrated system of any of clauses 1-14, wherein, when the integrated system operates in the charging cycle: the pump-turbine pumps water from the reservoir and through the penstock; a regulator disposed in the penstock diverts water to the second subsystem; the second subsystem desalinates water diverted from the penstock and releases brine to a brine storage tank; and a discharge valve that controls the flow of brine out of the brine tank remains closed.

16. The integrated system of any of clauses 1-15, wherein, when the integrated system operates in the generation cycle: water flows from the reservoir through a pump-turbine; the pump-turbine rotates causing a motor-generator to produce electricity; the second subsystem desalinates water diverted from the penstock and releases RO water to a clear well and brine to a brine tank; and a discharge valve that controls the flow of brine out of the brine tank is open.

17. The integrated system of any of clauses 1-16, wherein, when the integrated system operates in the idle cycle: a regulator disposed in the penstock diverts water to the second subsystem; the second subsystem desalinates water diverted from the penstock and releases brine to a brine tank; and a discharge valve that controls the flow of brine out of the brine tank is closed.

18. The integrated system of any of clauses 1-17, wherein the first subsystem is a pumped storage subsystem, the second subsystem is a RO desalination subsystem, and the third subsystem comprises at least one of a wind farm and a solar farm that generates electricity that is transmitted to at least one of the first subsystem, the second subsystem, and a grid.

19. An integrated system for clean energy storage and generation and reverse osmosis (RO) desalination comprising: a pump-turbine that facilitates a first flow of water between a water source, a first subsystem, and a second subsystem; and a valve that controls a second flow of waste between the second subsystem and the water source.

20. The integrated system of clause 19, further comprising a T-piece that couples the first subsystem to the second subsystem, wherein a regulator included within the T-piece controls the first flow of water.

21. The integrated system of clauses 19 or 20, wherein the valve controls the second flow of waste from the third subsystem to the water source.

22. The integrated system of any of clauses 19-21, further comprising a diffuser that: determines a concentration of brine in water exiting the integrated system, and triggers the valve to increase or decrease the second flow of brine based on a concentration of discharge exiting the integrated system.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. While the preceding is directed to embodiments of the present invention, other and further embodiments of the invention may be devised without departing from the basic scope thereof, and the scope thereof is determined by the claims that follow.

What is claimed is:

1. An integrated system, comprising:
    a hydraulic energy subsystem that stores hydraulic energy by pumping water to an elevated location;
    a water desalination subsystem that desalinates water;
    a penstock that facilitates flow of water between the hydraulic energy subsystem and the water desalination subsystem; and
    a pump-turbine that causes a motor-generator to generate electricity,
    wherein water flowing from the elevated location through the penstock includes a first portion that is provided to the pump-turbine, and a second portion that is provided to the water desalination subsystem.

2. The integrated system of claim 1, further comprising an energy source subsystem that provides renewable energy to at least one of the hydraulic energy subsystem or the water desalination subsystem.

3. The integrated system of claim 1, wherein:
    the hydraulic energy subsystem includes a reservoir at the elevated location that stores water; and
    the pump-turbine pumps water through the penstock and into the reservoir.

4. The integrated system of claim 1, wherein the hydraulic energy subsystem further comprises a tailrace that facilitates flow of water from an intake/outflow structure coupled to a water source to the pump-turbine, and wherein the intake/outflow structure includes multiple mesh structures that filter water.

5. The integrated system of claim 3, wherein the motor-generator consumes electricity.

6. The integrated system of claim 5, wherein, when water flows from the reservoir and through the penstock, the first portion of water rotates the pump-turbine causing the motor-generator to generate electricity.

7. The integrated system of claim 6, wherein the electricity generated by the motor-generator is released to a grid.

8. The integrated system of claim 1, wherein a pre-treatment module filters water flowing into the water desalination subsystem and outputs filtered water.

9. The integrated system of claim 8, wherein an energy recovery turbocharger pressurizes the filtered water and outputs the pressurized filtered water.

10. The integrated system of claim 9, wherein the water desalination subsystem includes a reverse osmosis (RO) unit that filters the pressurized filtered water through one or more ion-selective membranes and outputs pressurized waste and depressurized potable water.

11. The integrated system of claim 10, wherein the pressurized waste is released to the energy recovery turbocharger.

12. The integrated system of claim 11, wherein the energy recovery turbocharger further comprises a pressure exchanger, wherein the pressurized waste is depressurized by passing the pressurized waste through a first rotor of the pressure exchanger.

13. The integrated system of claim 12, wherein the depressurized waste is stored in a brine tank, and a discharge valve controls an exit flow of the depressurized waste from the brine tank.

14. The integrated system of claim 13, wherein the filtered water passes through a second rotor of the pressure exchanger that is connected to the first rotor by a shaft, wherein the filtered water is pressurized by the second rotor.

15. The integrated system of claim 3, wherein, when the integrated system operates in a charging cycle:
    the pump-turbine pumps water into the reservoir and through the penstock;
    a regulator disposed in the penstock diverts water to the water desalination subsystem;
    the water desalination subsystem desalinates water diverted from the penstock and releases brine to a brine tank; and
    a discharge valve that controls flow of brine out of the brine tank remains closed.

16. The integrated system of claim 3, wherein, when the integrated system operates in a generation cycle:
    the first portion of water flows from the reservoir through the pump-turbine;
    the pump-turbine rotates to cause the motor-generator to produce electricity;
    the water desalination subsystem:
        desalinates the second portion of water diverted from the penstock,
        releases potable water to a clear well, and
        releases brine to a brine tank; and
    a discharge valve that controls flow of brine out of the brine tank is open.

17. The integrated system of claim 1, wherein, when the integrated system operates in an idle cycle:
  a regulator disposed in the penstock diverts water to the water desalination subsystem;
  the water desalination subsystem desalinates water diverted from the penstock and releases brine to a brine tank; and
  a discharge valve that controls flow of brine out of the brine tank is closed.

18. The integrated system of claim 2, wherein:
  the hydraulic energy subsystem is a pumped storage subsystem,
  the water desalination subsystem is a reverse osmosis (RO) desalination subsystem, and
  the energy source subsystem comprises at least one of a wind farm or a solar farm that generates electricity that is transmitted to at least one of the hydraulic energy subsystem, the water desalination subsystem, or a grid.

19. An integrated system, comprising:
  a pump-turbine that facilitates a first flow of water between a water source, a hydraulic energy subsystem, and a water desalination subsystem; and
  a valve that controls a second flow of waste from the water desalination subsystem to the water source.

20. The integrated system of claim 19, further comprising a T-piece that couples the hydraulic energy subsystem to the water desalination subsystem, wherein a regulator included within the T-piece controls the first flow of water.

21. The integrated system of claim 19, further comprising a diffuser that:
  determines a concentration of brine in water exiting the integrated system, and
  triggers the valve to increase or decrease the second flow of waste based on a concentration of discharge exiting the integrated system.

* * * * *